United States Patent
Rippman

(10) Patent No.: US 12,532,059 B2
(45) Date of Patent: Jan. 20, 2026

(54) FLEXIBLE IMAGING APPARATUS

(71) Applicant: Bullet Tape LLC, Pine Lake, GA (US)

(72) Inventor: Patrick Rippman, Pine Lake, GA (US)

(73) Assignee: Bullet Tape LLC, Pine Lake, GA (US)

( * ) Notice: Subject to any disclaimer, the term of this patent is extended or adjusted under 35 U.S.C. 154(b) by 112 days.

(21) Appl. No.: 18/529,571

(22) Filed: Dec. 5, 2023

(65) Prior Publication Data
US 2025/0184587 A1    Jun. 5, 2025

(51) Int. Cl.
*H04N 23/54* (2023.01)
*H04N 23/51* (2023.01)
*H04N 23/66* (2023.01)

(52) U.S. Cl.
CPC ............. *H04N 23/54* (2023.01); *H04N 23/51* (2023.01); *H04N 23/66* (2023.01)

(58) Field of Classification Search
CPC ......... H04N 23/54; H04N 23/51; H04N 23/66
See application file for complete search history.

(56) References Cited

U.S. PATENT DOCUMENTS

| | | | |
|---|---|---|---|
| 6,535,226 B1* | 3/2003 | Sorokin | H04N 7/181 |
| | | | 715/740 |
| 8,654,177 B2 | 2/2014 | Kim et al. | |
| 9,123,172 B2* | 9/2015 | Sebring | H04N 23/51 |
| 10,025,165 B2* | 7/2018 | Greenthal | G03B 17/561 |
| 11,178,342 B2 | 11/2021 | Tong | |
| 2003/0071896 A1 | 4/2003 | Hunter | |
| 2005/0048829 A1* | 3/2005 | Nishio | H04N 23/54 |
| | | | 348/E5.025 |
| 2009/0297136 A1* | 12/2009 | Lin | G02B 7/021 |
| | | | 396/268 |
| 2013/0044240 A1* | 2/2013 | Leskela | H04N 23/54 |
| | | | 348/239 |
| 2016/0100154 A1* | 4/2016 | Ghyme | H04N 13/246 |
| | | | 211/1.51 |

(Continued)

FOREIGN PATENT DOCUMENTS

| | | | | |
|---|---|---|---|---|
| EP | 2306230 A1 * | 4/2011 | ........... | G02B 13/001 |
| EP | 3796085 A1 * | 3/2021 | ............. | G03B 17/55 |

OTHER PUBLICATIONS

Brand: VRmagic; Title Multi-Sensor Cameras; Dated Aug. 17, 2023 Website Link: https://www.vrmagic-imaging.com/oem-solutions/multi-sensor-cameras.

(Continued)

*Primary Examiner* — Timothy J Henn
(74) *Attorney, Agent, or Firm* — Jeremy Briggs

(57) ABSTRACT

An imaging apparatus is disclosed. The apparatus may include a flexible elongated body including a first surface and a second surface. The first surface may be disposed opposite to the second surface. The flexible elongated body may further include a channel formed in the first surface. A channel longitudinal axis may be parallel to a flexible elongated body longitudinal axis. The apparatus may further include a plurality of channel connectors disposed in the channel. Furthermore, the apparatus may include an image sensor including a sensor connector. The image sensor may be removably attached to the channel via the sensor connector and a first channel connector from the plurality of channel connectors.

19 Claims, 6 Drawing Sheets

(56) References Cited

U.S. PATENT DOCUMENTS

2016/0248985 A1    8/2016  Mate et al.
2021/0021768 A1*   1/2021  Tong .................... G06T 3/4038

OTHER PUBLICATIONS

Moghimi et al, Brand: National Library of Medicine; Title: Micro-Fresnel-Zone-Plate Array on Flexible Substrate for Large Field-of-View and Focus Scanning; Dated: Oct. 30, 2015 Website Link: https://www.ncbi.nlm.nih.gov/pmc/articles/PMC4626810.
Brand: Flexi Hose Store; Title: Flexi Hose Upgraded Expandable Garden Hose 50 ft Extra Strength ¾Solid Brass Fittings—The Ultimate No-Kink Flex 50 ft Water Hose (Black, 50FT); Dated: Aug. 17, 2023.

* cited by examiner

FLEXIBLE IMAGING APPARATUS

TECHNICAL FIELD

The present disclosure relates to a flexible imaging apparatus and more particularly to a flexible imaging apparatus including a plurality of image sensors.

BACKGROUND

Many professional/prosumer videographers add visual effects to images or videos captured by them for entertainment and/or commercial purposes. For example, a videographer may create slow-motion videos, stitch multiple images together to form a panoramic image, capture images or videos from multiple angles at once, manipulate time, and/or the like.

Adding such visual effects to images or videos may require high-end imaging equipment which may not be readily accessible. For example, availability of such high-end imaging equipment may be limited. Further, many a times, multiple high-end imaging equipment may be required to capture a perfect shot desired by the videographer. Procuring multiple high-end imaging equipment may not be feasible for many videographers.

Therefore, an easily-accessible imaging apparatus is required that may enable videographers to conveniently capture images or videos as per videographers' requirements.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
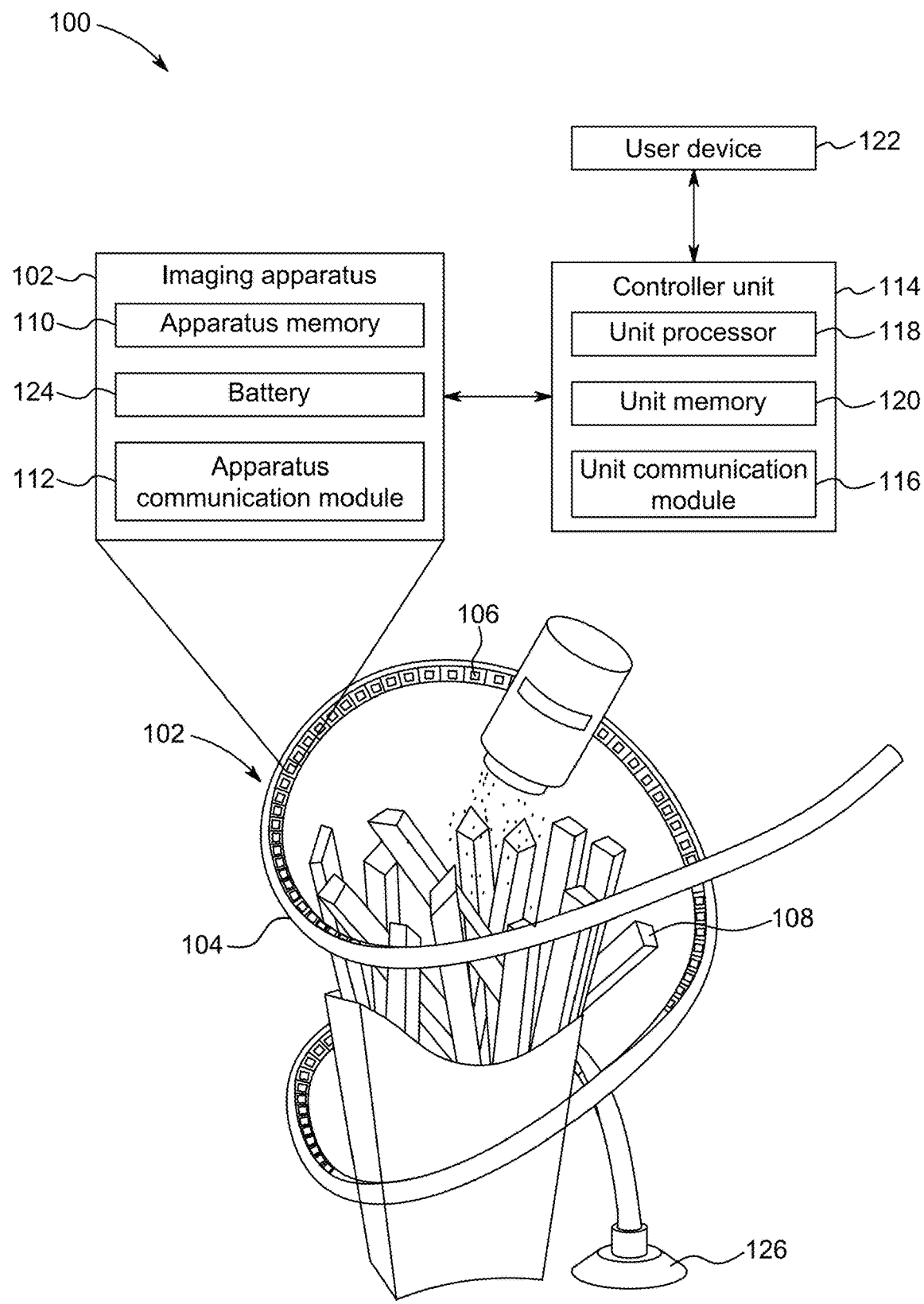
FIG. 1 depicts an example environment in which techniques and structures for providing the systems and methods disclosed herein may be implemented.

The present disclosure describes an imaging apparatus that includes a plurality of image sensors/cameras. The apparatus may include a flexible elongated body on which the plurality of image sensors may be removably attached. The elongated body may be made of deformable and malleable material that may enable a user to conveniently bend, twist or contort the body. The body may retain its deformed shape when the user deforms the body.

In some aspects, the body may include a channel or an elongated cavity that may include a plurality of female magnetic channel connectors. The female magnetic channel connectors may be disposed throughout a channel length. Further, each image sensor may include a male magnetic connector. The user may removably attach the image sensor with any one female magnetic channel connector by magnetically coupling the male magnetic connector with the female magnetic channel connector.

The male magnetic connector and the female magnetic channel connector may be electromagnetic connectors that may enable passage/transfer of power and command signals to the image sensor. For example, when the apparatus may be powered by a utility power source or an apparatus battery, the male magnetic connector and the female magnetic channel connector may enable transfer of energy from the power source/battery to the image sensor, thereby powering the image sensor. In some aspects, the apparatus may include or be communicatively coupled with a controller unit that may generate and transmit command signals to the image sensor to control image sensor operation. In this case, the male magnetic connector and the female magnetic channel connector may enable transfer of command signals from the controller unit to the image sensor.

In further aspects, the channel may include rails on which the user may slide the image sensor to change image sensor position on the channel from one location to another.

In additional aspects, the imaging apparatus may include male and female electromagnetic and mechanical connectors at an elongated body distal end and an elongated body proximal end. The user may attach a plurality of imaging apparatuses in series to form a long imaging apparatus by attaching the plurality of imaging apparatuses via respective male and female electromagnetic and mechanical connectors.

The present disclosure discloses an imaging apparatus that facilitates a user to conveniently capture object images/videos from multiple angles by twisting or deforming an imaging apparatus body. Since the imaging apparatus is made of a plurality of image sensors that may be mini-cameras, the imaging apparatus may be easily procured by the user or may be easily accessible. Further, the imaging apparatus provides flexibility to the user to increase or decrease a count of image sensors in the imaging apparatus by conveniently removing or adding image sensors from/to the channel. Furthermore, by using the controller unit, the user may conveniently add a plurality of visual effects on the images/videos captured by the plurality of image sensors included in the imaging apparatus.

These and other advantages of the present disclosure are provided in detail herein.

ILLUSTRATIVE EMBODIMENTS

The disclosure will be described more fully hereinafter with reference to the accompanying drawings, in which example embodiments of the disclosure are shown, and not intended to be limiting.

FIG. 1 depicts an example environment 100 in which techniques and structures for providing the systems and methods disclosed herein may be implemented. The environment 100 may include an imaging apparatus 102 having a flexible elongated body 104 (or body 104). The body 104 may be made of flexible and malleable material that enables a user (not shown) to easily deform the body 104. Further, the body 104 may retain or stay in its deformed shape when the body 104 is deformed. For example, if the user deforms the body 104 to be in a helical shape, the body 104 may retain or stay in the helical shape when the body 104 is deformed. In some aspects, the body 104 may be made of silicon, rubber, plastic, a combination thereof, and/or the like.

The imaging apparatus 102 may include a plurality of image sensors 106 (or mini cameras) that may be disposed on the surface of the body 104, throughout a body length (or covering a substantial portion). The image sensors 106 may be configured to capture images or videos of an object 108 that may be present in the image sensors' field of view (FOV). In the exemplary aspect depicted in FIG. 1, the object 108 is shown to be fries placed in a container. In addition, a condiment container (e.g., a salt container) is shown to be adding salt to the fries. The object 108 shown in FIG. 1 is for illustrative purpose only, and should not be construed as limiting. The fries may be replaced by any other object, without departing from the present disclosure scope.

In an exemplary aspect, the user may wrap or dispose the body 104 in a helical manner or a circular manner around the object 108, and may enable the image sensors 106 to capture object images from 360 degree angles (or multiple angles). Since the image sensors 106 are disposed along the body length and the body 104 may be easily deformed to be in the helical shape (or any other shape) around the object 108, the image sensors 106 may capture object images from different angles (e.g., 360 degree angles).

The imaging apparatus 102 may further include an apparatus memory 110 that may be communicatively coupled with the image sensors 106 and configured to store the images/videos captured by the image sensors 106. The imaging apparatus 102 may further include an apparatus communication module 112 that may be configured to communicatively couple the imaging apparatus 102 with other devices or systems, and transmit/receive data/signals/information to/from the other devices or systems. For example, the apparatus communication module 112 may be configured to communicatively couple the imaging apparatus 102 with a controller unit 114 (or unit 114) that may be a computer, a laptop, a mobile phone, a tablet, or any other similar unit with communication capabilities. Further, the apparatus communication module 112 may be configured to transmit images/videos stored in the apparatus memory 110 to the unit 114.

In some aspects, the imaging apparatus 102 may be communicatively coupled with the unit 114 via a wired connection. In other aspects, the imaging apparatus 102 may be wirelessly connected with the unit 114 via a wireless communication network. The wireless communication network may be and/or include the Internet, a private network, public network or other configuration that operates using any one or more known communication protocols such as, for example, transmission control protocol/Internet protocol (TCP/IP), Bluetooth®, BLE, Wi-Fi based on the Institute of Electrical and Electronics Engineers (IEEE) standard 802.11, Ultra-wideband (UWB), and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

In some aspects, the unit 114 may be part of the imaging apparatus 102. In other aspects, the unit 114 may be different from the imaging apparatus 102, as shown in FIG. 1. The unit 114 may include a unit communication module 116 that may be configured to communicatively couple the unit 114 with other devices or systems, e.g., the imaging apparatus 102. The unit communication module 116 may be further configured to transmit/receive data/signals/information to/from the other devices or systems. For example, the unit communication module 116 may be configured to receive the images/videos transmitted by the apparatus communication module 112 to the unit 114. The unit communication module 116 may be further configured to transmit command signals to the imaging apparatus 102, to control imaging apparatus operation.

The unit 114 may further include a unit processor 118 and a unit memory 120. The unit memory 120 may store programs in code and/or store data for performing various system operations in accordance with the present disclosure. Specifically, the unit processor 118 may be configured and/or programmed to execute computer-executable instructions stored in the unit memory 120 for performing various unit functions in accordance with the disclosure. Consequently, the unit memory 120 may be used for storing code and/or data code and/or data for performing operations in accordance with the present disclosure.

In one or more aspects, the unit processor 118 may be disposed in communication with one or more memory devices (e.g., the unit memory 120 and/or one or more external databases (not shown in FIG. 1)). The unit memory 120 may include any one or a combination of volatile memory elements (e.g., dynamic random-access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.).

The unit memory 120 may be one example of a non-transitory computer-readable medium and may be used to store programs in code and/or to store data for performing various operations in accordance with the disclosure. The instructions in the unit memory 120 may include one or more separate programs, each of which may include an ordered listing of computer-executable instructions for implementing logical functions.

In some aspects, the unit memory 120 may be configured to store the images/videos transmitted by the apparatus communication module 112 to the unit communication module 116. Stated another way, the unit memory 120 may be configured to store the images/videos captured by the image sensors 106. The unit processor 118 may be configured to perform post-processing on the images/videos captured by the image sensors 106 and stored in the unit memory 120. The unit processor 118 may perform post-processing to add one or more visual effects to the images/videos captured by the image sensors 106 (e.g., based on user inputs). For example, as the image sensors 106 capture video of the salt being added to the fries from 360 degree angles (or multiple angles), the unit processor 118 may pause the video and view the fries from various angles and/or add visual effects to the video. The unit processor 118 may further increase or decrease video speed, pause specific parts of the video, and/or the like, to add visual effects to the video. In some aspects, the unit processor 118 may be configured to access, via the unit communication module 116, one or more known visual effect or image processing algorithms/platforms/tools to add visual effects to the images/video captured by the image sensors 106.

The unit processor 118 may be further configured to control imaging apparatus operation during production stage, i.e., when the image sensors 106 may be capturing object images/video. For example, the unit processor 118 may transmit, via the unit communication module 116, command signals to the imaging apparatus 102 to control operation of each image sensor 106. For example, the unit processor 118 may transmit command signals to increase/decrease resolution of one or more image sensors, activate/deactivate one or more image sensors, cause adjustment of one image sensor to sync with other image sensors, adjust settings of each image sensor, adjust feather between image sensors sequentially if settings are made differently to one or more image sensors, and/or the like.

In some aspects, the unit processor 118 may control the imaging apparatus operation based on user inputs obtained via a user device 122 and the wired/wireless communication network described above. The user device 122 may be, for example, a mobile phone, a tablet, and/or the like, and may be associated with an imaging apparatus user. The user device 122 may be communicatively coupled with the unit 114 (and the imaging apparatus 102, when the unit 114 may be part of the imaging apparatus 102) via the unit communication module 116 and the wireless communication network described above. The user device 122 may be configured to transmit user inputs to the unit 114, as well as receive images/video feed stored in the apparatus memory 110 and/or the unit memory 120 via the unit communication module 116 and the wireless communication network.

In some aspects, the imaging apparatus 102 and/or the unit 114 may be powered via a utility power source (not shown). Further, the imaging apparatus 102 and the unit 114 may include respective batteries that may store energy and power the apparatus/unit when the apparatus/unit may not be connected to the utility power source. For example, the imaging apparatus 102 may include a battery 124 that may be configured to store and provide energy/power to the imaging apparatus 102 to enable image sensor operation.

In further aspects, the imaging apparatus 102 may be packaged with one or more additional components/units including, but not limited to, a mounting base 126, one or more mounting clips (not shown), and/or the like. The user may mount the imaging apparatus 102 on the mounting base 126 to enable the imaging apparatus 102 to be placed on a flat/horizontal surface, as shown in FIG. 1. The mounting clips may enable the imaging apparatus 102 to be attached or connected to the mounting base 126, and/or to other surfaces or structures, e.g., walls, tripods, stands, and/or the like.

Figure 2:
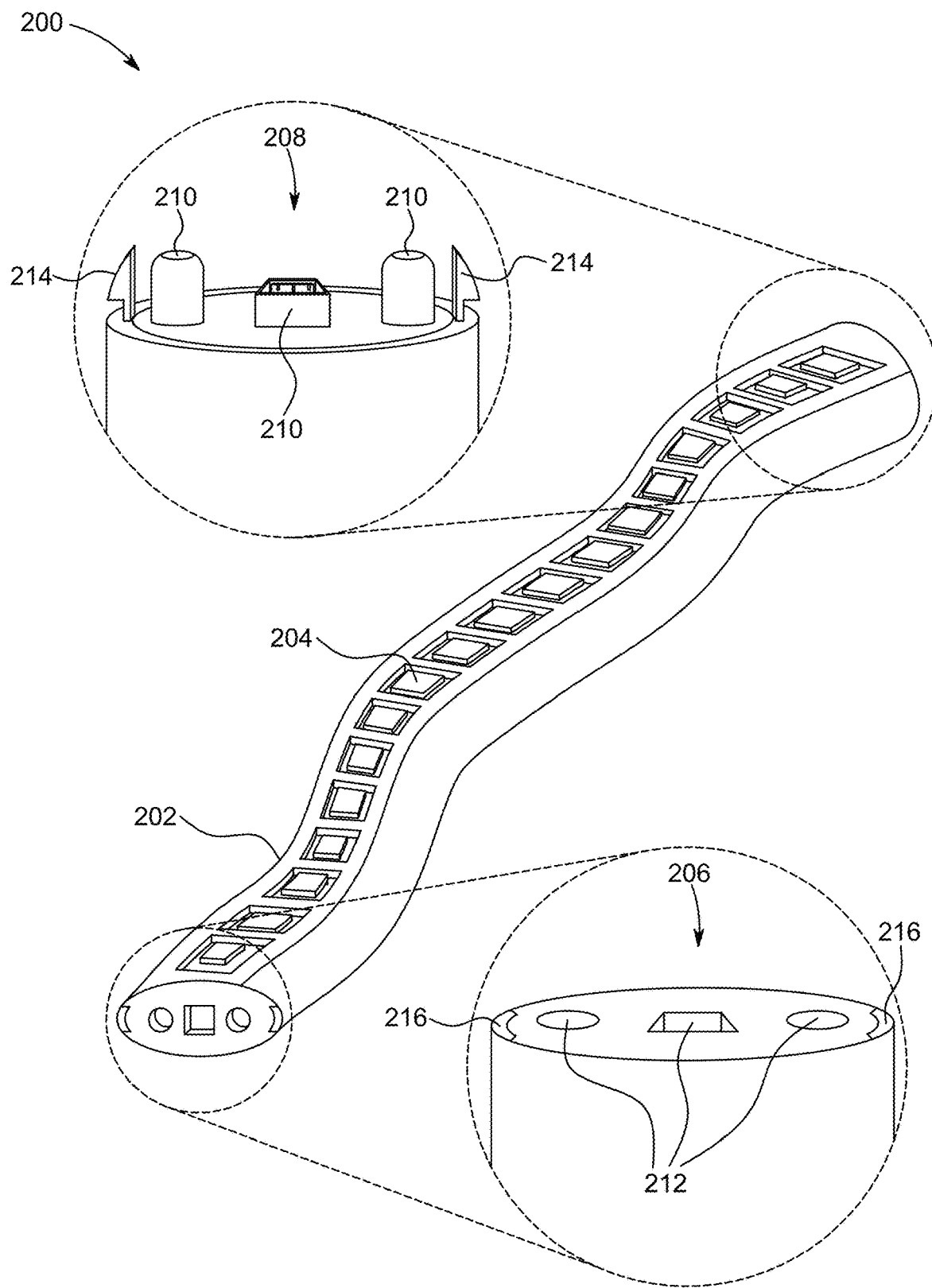
FIG. 2 depicts an example first imaging apparatus in accordance with the present disclosure.

FIG. 2 depicts an example first imaging apparatus 200 (or apparatus 200) in accordance with the present disclosure. The apparatus 200 may be similar to the imaging apparatus 102, and may include a flexible elongated body 202 (or body 202) that may be same as the body 104. The body 202 may be of any length, and the cross-section of the body 202 may be of any shape. For example, the body cross-section may be shaped as a rectangle, a square, an ellipse, etc. In the exemplary aspect depicted in FIG. 2, the body cross-section is shown to be elliptical in shape.

As described above, since the body 202 is made of flexible and malleable material, the user may conveniently bend, twist or contort the body 202 to deform the body 202 to any desired shape. The apparatus 200 may further include a plurality of image sensors 204 (that may be same as the image sensors 106) that may be disposed in the body 202. In an exemplary aspect, the image sensors 204 may be disposed on a flexible strip that may be attached to a body interior portion. The lens of each image sensor 204 may face the exterior portion/surface of the body 202 so that the image sensor 204 may conveniently capture the object image/video. In some aspects, the body exterior surface may be covered by a transparent covering that may protect the image sensors 204 from ambient environment and provide an unobstructed object view to the image sensors 204.

The body 202 may include a body proximal end and a body distal end. The body proximal end may include a female connector 206 and the body distal end may include a male connector 208. The apparatus 200 may be connected to other apparatuses (that may be similar to the apparatus 200) in a series arrangement via the male and female connectors 206, 208. For example, the male connector 208 may be connected with a female connector of an apparatus that may be placed adjacent to the body distal end, and the female connector 206 may be connected with a male connector of another apparatus that may be placed adjacent to the body proximal end. In this manner, the user may connect the apparatus 200 with two apparatuses, thus elongating the length of the entire imaging apparatus. In this case, the apparatus 200 may be one "segment" of a long imaging apparatus. The user may attach any count/number of apparatuses in series based on the required length of the long imaging apparatus.

The male connector 208 may include one or more protruded pin connectors 210 and the female connector 206 may include one or more cavity connectors 212. The protruded pin connectors 210 and the cavity connectors 212 may be power connectors and/or Universal Serial Bus (USB) connectors that may enable passage of power and electromagnetic signals. For example, the male connector 208 may enable passage/transfer of power signals, data and command signals (that the apparatus 200 may receive from the unit 114) from/to the female connector of an adjacent apparatus that may be connected to the apparatus 200 in series, and the female connector 206 may enable passage/transfer of power signals, data (e.g., images/video feed) and command signals from/to the male connector of another adjacent apparatus that may be connected to the apparatus 200 in series.

When multiple apparatuses may be connected with each other in series via respective male and female connectors to form a long imaging apparatus, connecting one apparatus to a power source may charge all the apparatuses together. Further, the unit 114 may transmit the command signals to any one apparatus (e.g., the apparatus that may be connected via a wired or wireless connection with the unit 114), and the commands signals may be transferred to all the apparatuses via respective male and female connectors to sync the image sensors included in each apparatus.

In some aspects, the body distal end/male connector 208 may include one or more protruded clips 214 and the body proximal end/female connector 206 may include one or more cavities 216. The protruded clips 214 may enable mechanical attachment of the male connector 208 with cavities of a female connector of an adjacent apparatus, and the cavities 216 may enable mechanical attachment of the female connector 206 with protruded clips of a male connector of another adjacent apparatus.

The protruded clips 214 and the protruded pin connectors 210 may be disposed in any arrangement on the male connector 208. For example, as shown in FIG. 2, the protruded pin connectors 210 may be disposed between the two protruded clips 214, although the present disclosure is not limited to such an arrangement. Similarly, the cavities 216 and the cavity connectors 212 may be disposed in any arrangement on the female connector 206. For example, as shown in FIG. 2, the cavity connector 212 may be disposed between the two cavities 216, although the present disclosure is not limited to such an arrangement.

Further, shapes and alignment of the protruded clips 214 and the protruded pin connectors 210 may correspond to the shapes and alignment of the cavities 216 and the cavity connectors 212, to enable secure and convenient attachment/connection between male and female connectors 208, 206.

Figure 3:
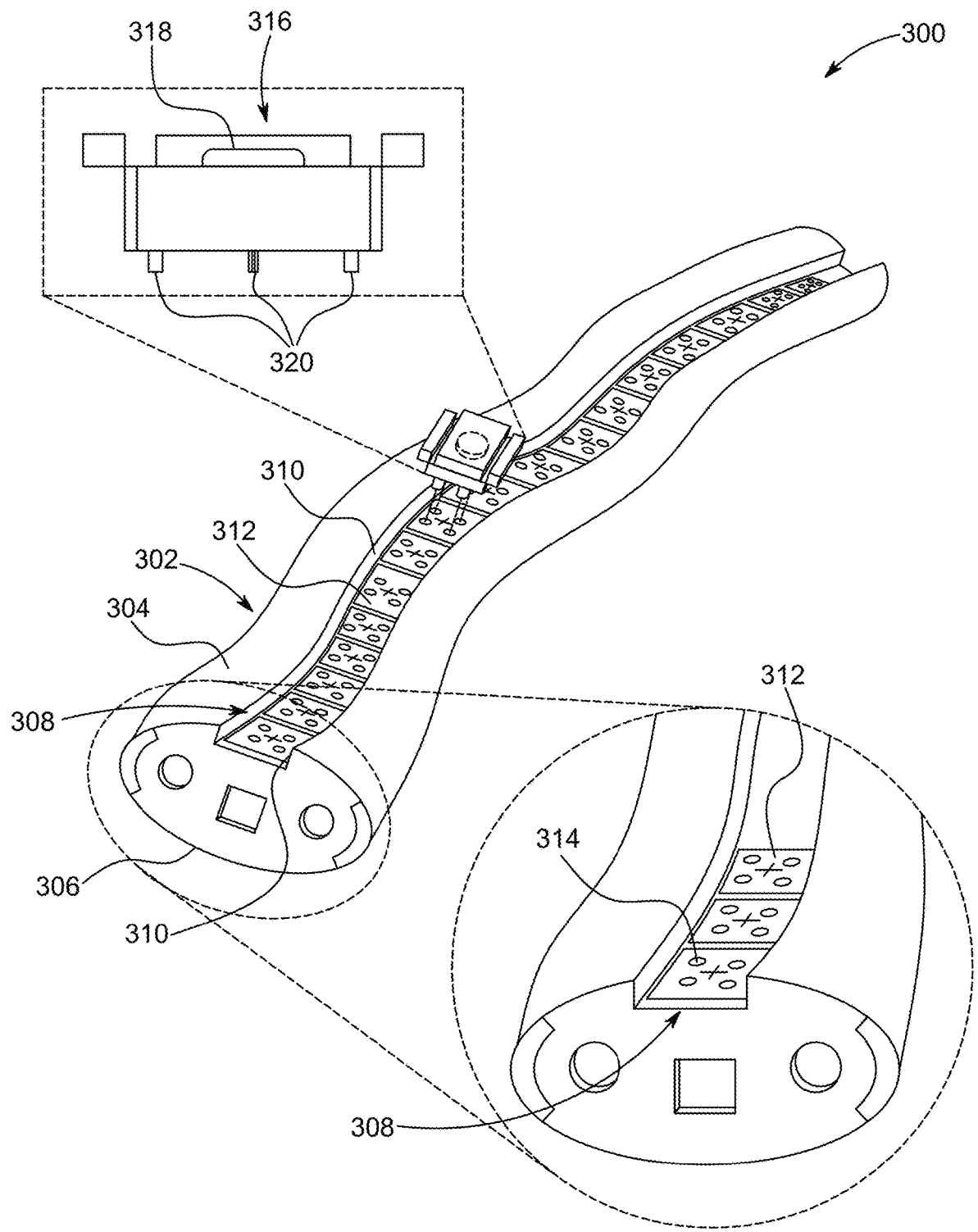
FIG. 3 depicts an example second imaging apparatus in accordance with the present disclosure.

FIG. 3 depicts an example second imaging apparatus 300 (or apparatus 300) in accordance with the present disclosure. The apparatus 300 may be similar to the apparatus 200 (and may be connected with other similar apparatuses in series via apparatus proximal and distal ends, as described above); however, the apparatus 300 may not include the strip of image sensors that may be attached to a body interior portion. Instead, the apparatus 300 may include one or more image sensors that may be removably attached to the apparatus body.

The apparatus 300 may include a flexible elongated body 302 (or body 302) that may be similar to the body 202. The body 302 may include a first surface 304 and a second surface 306. The first surface 304 may be disposed opposite to the second surface 306, as shown in FIG. 3. The body 302 may further include a channel 308 formed in the first surface 304.

The channel 308 may be a trough or an elongated cavity formed in the first surface 304. A channel longitudinal axis may be parallel to a flexible elongated body longitudinal axis. In some aspects, a channel length may be equivalent to a flexible elongated body length, as shown in FIG. 3. In other aspects, the channel length may be less than the flexible elongated body length (e.g., covering 60-90% of the flexible elongated body length). Further, a channel width may be less or smaller than a flexible elongated body width. For example, the channel width may be in a range of 40-60% of the flexible elongated body width.

The channel 308 may include channel sidewalls 310 and a channel bottom surface 312. Height of the channel sidewalls 310 may be in a range of 10-25% of a flexible elongated body thickness. The apparatus 300 may further include a plurality of channel connectors 314 that may be disposed in the channel bottom surface 312 along the entire channel length. In some aspects, the plurality of channel connectors 314 may be magnetic female connectors that may be configured to magnetically connect with magnetic or ferrous male connectors.

The apparatus 300 may further include one or more image sensors 316 that may be removably attached to the channel 308. Although FIG. 3 depicts one image sensor 316, the apparatus 300 may include a plurality of image sensors that may be disposed along the entire channel length or on a portion of the channel length. Each image sensor 316 may include a lens 318 disposed on an image sensor front portion and one or more sensor connectors 320 disposed on an image sensor back portion. In some aspects, the sensor connectors 320 may be magnetic or ferrous male connectors that may be configured to magnetically connect with magnetic or ferrous female connectors, e.g., the channel connectors 314.

The image sensor 316 may be removably and magnetically attached to the channel 308 via the sensor connectors 320 and any one of the plurality of channel connectors 314. The image sensor 316 may be removably attached to the channel 308 such that the lens 318 may face away from the second surface 306 and the sensor connectors 320 may face towards the second surface 306.

In some aspects, the sensor connectors 320 and each channel connector 314 may be electromagnetic connectors that may be configured to enable energy/power transfer from the utility power source (when the apparatus 300 may be connected with the utility power source) or the battery 124 to the image sensor 316, thereby enabling powering of the image sensor 316. The sensor connectors 320 and the channel connector 314 may be further configured to enable transfer of command signals from the controller unit 114 to the image sensor 316 when the controller unit 114 controls the image sensor operation, and/or transfer of data (e.g., image/video feed) from the image sensor 316 to the controller unit 114.

In some aspects, the controller unit 114 may be connected with the plurality of channel connectors 314 via a wired connection. In this case, the sensor connectors 320 and the channel connector 314 may enable transfer of command signals from the controller unit 114 to the image sensor 316 via the wired connection (or transfer of data from the image sensors 316 to the controller unit 114). In other aspects, as described above in conjunction with FIG. 1, the controller unit 114 may be wirelessly connected with the image sensor 316. In this case, the controller unit 114 may transmit the command signals to the image sensor 316 via the apparatus communication module 112 (or an apparatus transceiver) and the unit communication module 116 (or a unit transceiver), or receive data from the image sensors 316.

Since the image sensor 316 may be removably attached to the channel 308, the user may attach the image sensor 316 to the channel 308 at any position along the channel length, thereby enabling the user to customize image sensor position/location on the apparatus 300 based on user's requirements. Further, the user may conveniently increase or decrease a count of image sensors in the apparatus 300 by attaching or removing the image sensors from the channel 308 based on user's requirements.

Figure 4:
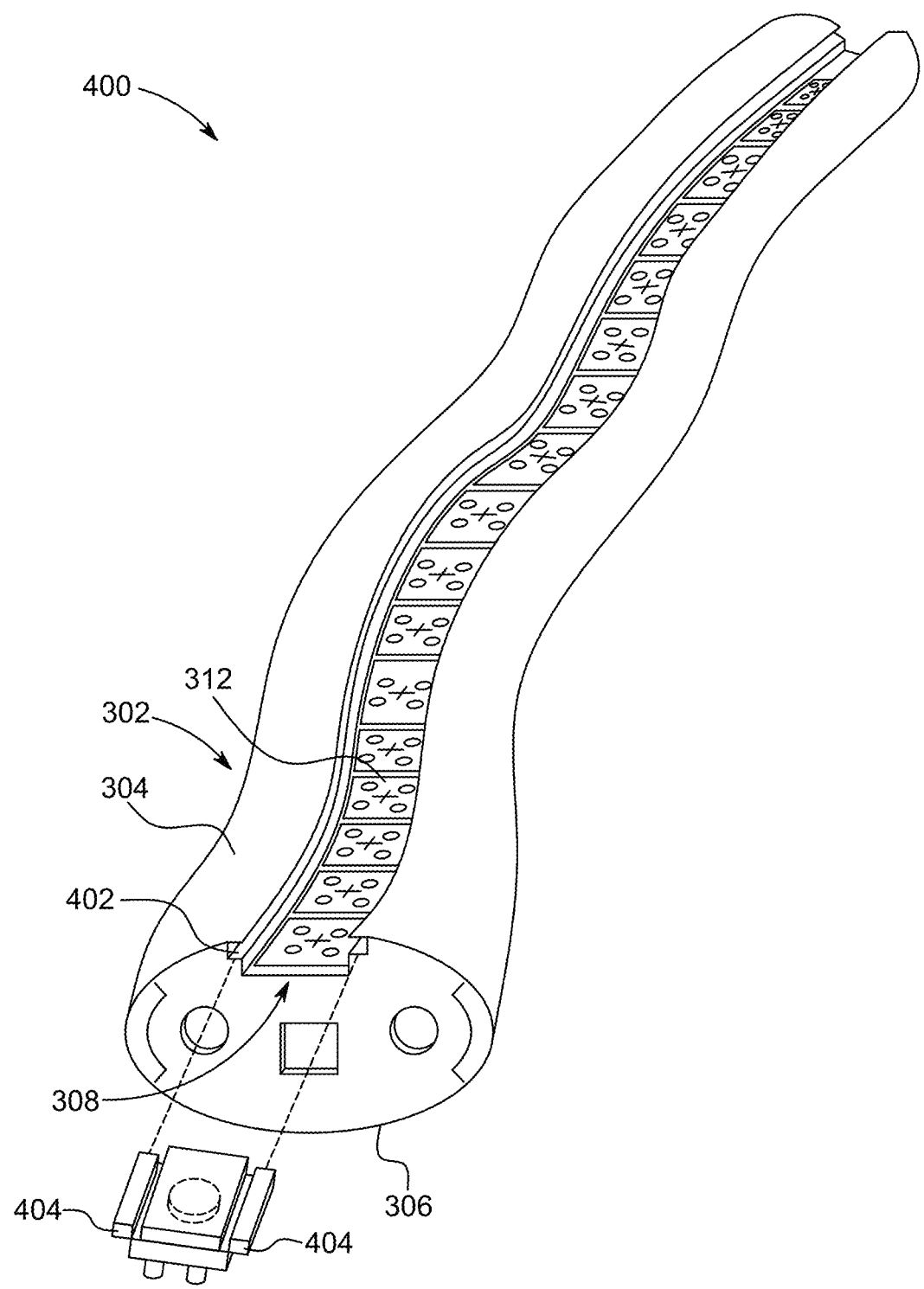
FIG. 4 depicts an example third imaging apparatus in accordance with the present disclosure.

FIG. 4 depicts an example third imaging apparatus 400 in accordance with the present disclosure. The apparatus 400 may be similar to the apparatus 300; however, the apparatus 400 may additionally include one or more sliding bars or rails 402 that may be disposed in the channel 308 along the entire channel length. The rails 402 may be disposed on both the channel side walls 310 and/or the channel bottom surface 312.

In the apparatus 400, the image sensor 316 may be configured to slide on the rails 402. Specifically, to move the image sensor 316 from one location to another on the channel 308, the user may first slightly "lift" the image sensor 316 upwards to decouple the sensor connectors 320 from a first channel connector (to which the sensor connectors 320 may be magnetically coupled). The user may then slide the image sensor 316 on the rails 402 to a desired location on the channel 308. Thereafter, the user may "press" the image sensor 316 downwards to magnetically couple the sensor connectors 320 to a second channel connector that may be disposed at the desired location on the channel 308. In this manner, the user may conveniently slide the image sensor 316 on the rails 402 to change image sensor location on the channel 308. In some aspects, the image sensor 316 may include one or more rail holders 404 that may mechanically couple with the rails 402 and enable the user to conveniently slide the image sensor 316 on the rails 402.

The remaining elements of the apparatus 400 are same as the elements of the apparatus 300, and hence are not described again here for the sake of simplicity and conciseness.

Figure 5:
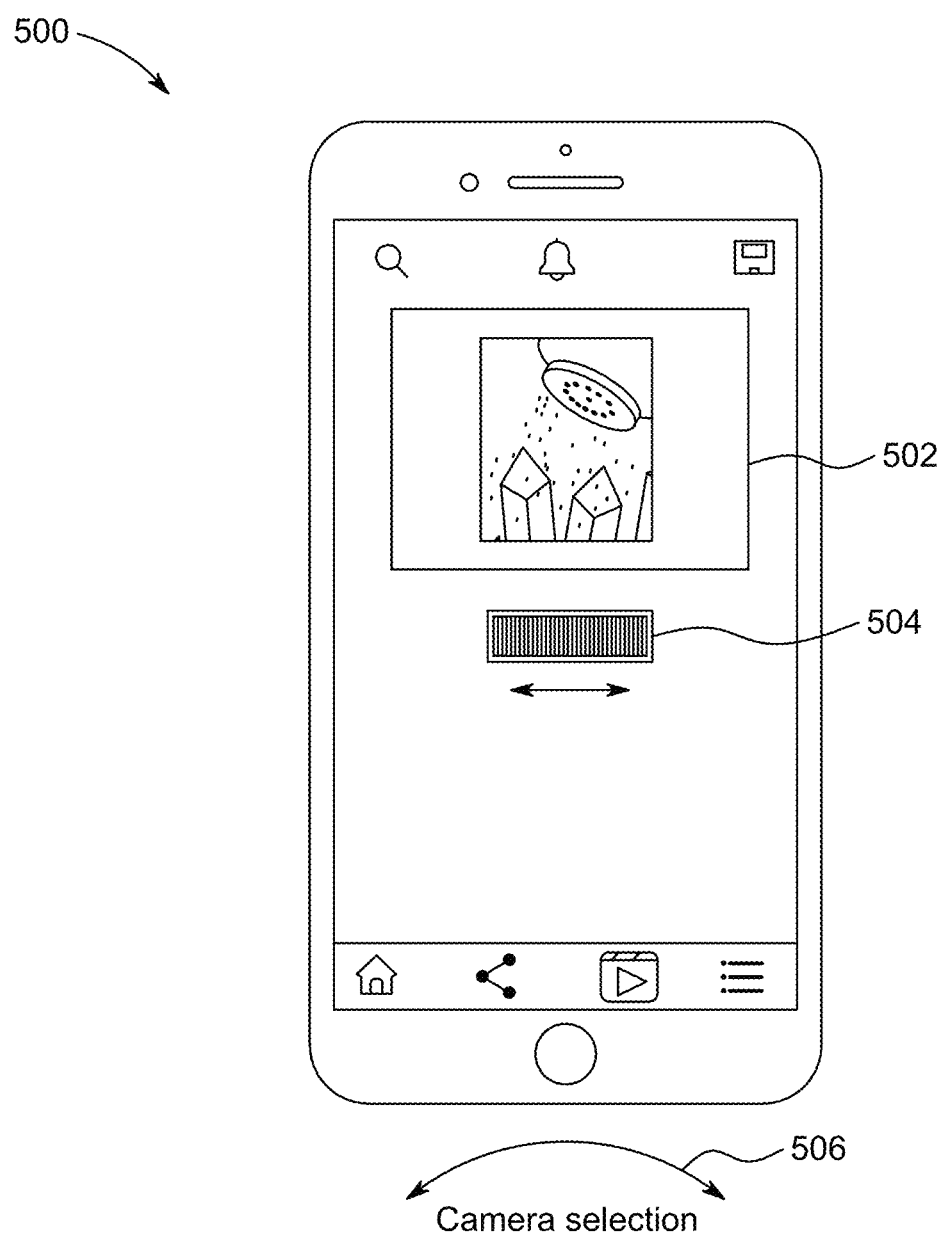
FIG. 5 depicts an example user device configured to control an imaging apparatus operation in accordance with the present disclosure.

FIG. 5 depicts an example user device 500 configured to control an imaging apparatus operation in accordance with the present disclosure. The user device 500 may be same as the user device 122 described above in conjunction with FIG. 1. As described above, the unit 114 may control operation of an imaging apparatus (e.g., the imaging apparatus 102, 200, 300 or 400) based on user inputs obtained via the user device 500.

In an exemplary aspect, the user device 500 may receive the video feed (or images) captured by the image sensor 316 via the unit 114. The user device 500 may include a display 502 that may be configured to display the received video feed, as shown in FIG. 5. The user may switch from one image sensor to another to receive the video feed from another angle by using one or more digital switches that may be rendered on the user device 500. For example, the user device 500 may render/display a digital horizontal rocker switch 504 using which the user may select an image sensor, from the plurality of image sensors included in the apparatus 300, from which the user may desire to view the video feed. In an exemplary aspect, the user may rotate the digital horizontal rocker switch 504 left or right during the production stage to select or move from one image sensor to another.

In further aspects, the user device 500 may enable image sensor selection based on user device horizontal or lateral tilt 506.

The user device 500 may further include additional controls or switches (not shown) that may enable the user to perform other production or post-production actions. For example, the user device 500 may include a digital vertical rocker switch that may enable the user to move recorded video feeds forward/backward or quickly/slowly in time across all synchronized video feeds. Stated another way, the digital vertical rocker switch 506 may enable the user to manipulate time. The user device 500 may further enable the user to manipulate time based on user device vertical or longitudinal tilt.

Figure 6:
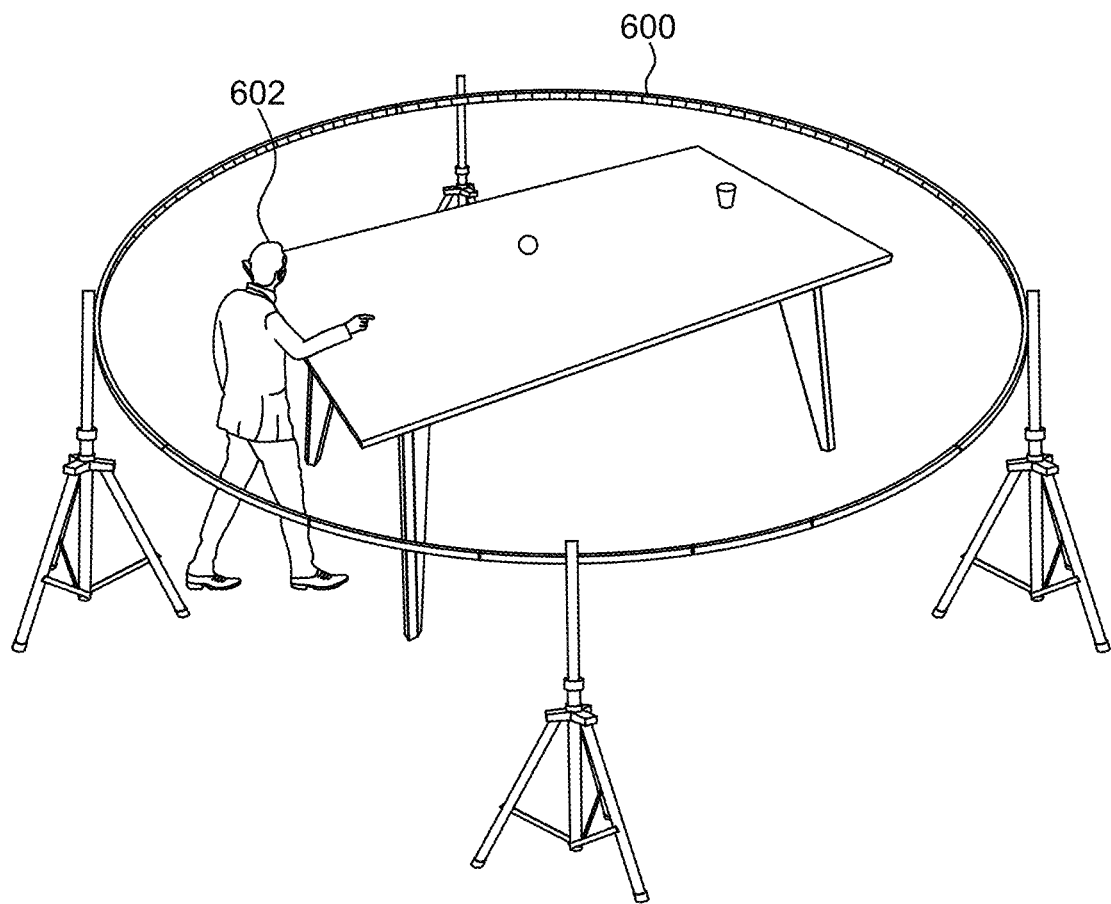
FIG. 6 depicts an example usage of an imaging apparatus in accordance with the present disclosure.

FIG. 6 depicts an example usage of an imaging apparatus 600 (or apparatus 600) in accordance with the present disclosure. The apparatus 600 may be a long imaging apparatus that may be formed by attaching a plurality of "small" imaging apparatuses together. For example, the apparatus 600 may be formed by attaching a plurality of apparatuses 200 together via respective male connectors 208 and female connectors 206.

The apparatus 600 may surround an object 602 and capture object images/videos from 360 degree angles. In the exemplary aspect depicted in FIG. 6, the apparatus 600 is shown to be mounted on a plurality of stands/tripods/support structures and the object 602 is shown as a user who may be attempting to throw a ball in a cup. The exemplary aspect depicted in FIG. 6 should not be construed as limiting, and the user may be replaced by any other object (e.g., a vehicle, an artifact, etc.) without departing from the present disclosure scope.

The user may add one or more visual effects to the videos captured by the apparatus 600 during the post-production phase by using the controller unit 114. For example, the user may freeze video frames in time, view the object 602 from different angles, and/or the like, to add visual effects to the videos based on user's requirements.

In an exemplary aspect, the controller unit 114 may automatically and digitally scale, position and adjust rotation of each image sensor to most minimal degree to ensure that the object 602 is perfectly aligned from one image sensor to another.

The controller unit 114 may be further configured to generate/produce a false frame in between each image sensor based on a combination of images captured from each image sensor to another.

The controller unit 114 may be additionally configured to mask out apparatus segments from background (if visible) from any image sensor, when the image sensors/cameras included in the apparatus 600 may be capturing object images.

In additional aspects, the controller unit 114 may auto-track, rotoscope and produce a feathered mask of facial features of the user (object 602) from each image sensor's perspective and enable only the face layer to continue at normal speed while adjusting time on surrounding layer without the face/facial mask. Furthermore, as shown in FIG. 6, when the user (object 602) may be throwing the ball into the cup and may be singing a song, the controller unit 114 may adjust timing within the scene to enable the user to sing the song from start to finish at the same time it takes for the ball to land in the cup in slow motion.

The controller unit 114 may further enable the user to choose perspective when the user may be viewing the scene/video, via one or more additional controls/switches (not shown) included in the user device 500.

The user may further choose the order of the frames and the timing to view the frames by using the controller unit 114. Specifically, the user may use one or more additional controls/switches (not shown) included in the user device 500 to choose the order of the frames and the timing to view the frames.

The controller unit 114 may further enable the user to manipulate video speed and perspective during post-production, via one or more additional controls/switches (not shown) included in the user device 500.

The controller unit 114 may further enable the user, via one or more additional controls/switches (not shown) included in the user device 500, to customize and increase imaging apparatus frame rate by starting the recording process of each image sensor a fraction of a frame later than the image sensor next to it in sequence.

The controller unit 114 may further enable the user, via one or more additional controls/switches (not shown) included in the user device 500, to maximize image quality at the expense of post-production time-manipulation, producing a single video sequence with predetermined timing settings composed of high-resolution frames from each image sensor.

In some aspects, the apparatuses described above may be packaged with one or more accessories including, but not limited to, an adaptor, a computer wire, the mounting clips, the mounting base 126, and/or the like. The adaptor may enable charging of the apparatus/image sensors. The computer wire may enable connection between the apparatus and the controller unit 114.

A person ordinarily skilled in the art may appreciate from the description above that the imaging apparatus 102 and the controller unit 114 allow users a greater range of movement and the ability to decide the final composition after production through the manipulation of both time and perspective.

Specifically, the imaging apparatus 102 and the controller unit 114 provide users the ability obtain video shots with movements as simple as those provided by tools such as a horizontal slider or a vertical jib arm crane, to videos with far more intricate movements that would currently require tools such as a servo arm with a pivoting gimbal camera mount, which itself is limited by its size vs. imaging apparatus' size allowing for shots that can move through tighter situations, and the flexibility to contort in various directions to surpass the movement abilities provided by a servo arm.

Further, the imaging apparatus 102 and the controller unit 114 provide users the ability to design the final composition after production due to having access to all of the image sensors' video feeds after recording vs. being locked into one single recorded composition. The imaging apparatus 102 and the controller unit 114 provide users the ability to linger on a particular perspective point/range, exclude undesired perspective points/range, and/or warp time based on the most desired angle(s) and moment of the action occurring in front of all of the cameras to produce the best composition out of all available options in post-production.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. An imaging apparatus comprising:
a flexible elongated body comprising:
a first surface and a second surface, wherein the first surface is opposite to the second surface; and
a channel formed in the first surface, wherein a channel longitudinal axis is parallel to a flexible elongated body longitudinal axis;
a plurality of channel connectors disposed in the channel; and
an image sensor comprising a sensor connector, wherein the image sensor is removably attached to the channel via the sensor connector and a first channel connector from the plurality of channel connectors.

2. The imaging apparatus of claim 1, wherein the image sensor is magnetically attached to the channel.

3. The imaging apparatus of claim 1, wherein the channel comprises channel side walls and a channel bottom surface.

4. The imaging apparatus of claim 3, wherein the plurality of channel connectors is disposed on the channel bottom surface along a channel length.

5. The imaging apparatus of claim 3 further comprising one or more rails disposed along a channel length on at least one of the channel bottom surface and the channel side walls.

6. The imaging apparatus of claim 5, wherein the image sensor is configured to slide on the one or more rails.

7. The imaging apparatus of claim 1, wherein a channel length is equivalent to a flexible elongated body length.

8. The imaging apparatus of claim 1, wherein a channel length is less than a flexible elongated body length.

9. The imaging apparatus of claim 1, wherein a channel width is less than a flexible elongated body width.

10. The imaging apparatus of claim 1, wherein the sensor connector and the first channel connector are configured to enable energy transfer from an external power source to the image sensor.

11. The imaging apparatus of claim 1 further comprising a battery, wherein the sensor connector and the first channel connector are configured to enable energy transfer from the battery to the image sensor.

12. The imaging apparatus of claim 1 further comprising a controller unit configured to control image sensor operation.

13. The imaging apparatus of claim 12, wherein the controller unit is connected with the first channel connector via a wired connection, and wherein the sensor connector and the first channel connector are configured to enable transfer of command signals from the controller unit to the image sensor via the wired connection.

14. The imaging apparatus of claim 12 further comprising a transceiver, wherein the controller unit is wirelessly connected with the image sensor via the transceiver.

15. The imaging apparatus of claim 1, wherein the flexible elongated body further comprises a body distal end and a body proximal end, and wherein the body distal end comprises a male connector and the body proximal end comprises a female connector.

16. An imaging apparatus comprising:
a flexible elongated body comprising:
 a first surface and a second surface, wherein the first surface is opposite to the second surface;
 a channel formed in the first surface, wherein a channel longitudinal axis is parallel to a flexible elongated body longitudinal axis;
 a body distal end and a body proximal end, wherein the body distal end comprises a male connector and the body proximal end comprises a female connector; and
a plurality of channel connectors disposed in the channel; and
an image sensor comprising a sensor connector, wherein the image sensor is removably attached to the channel via the sensor connector and a first channel connector from the plurality of channel connectors.

17. The imaging apparatus of claim 16, wherein the image sensor is magnetically attached to the channel.

18. The imaging apparatus of claim 16, wherein a channel width is less than a flexible elongated body width.

19. An imaging apparatus comprising:
a flexible elongated body comprising:
 a first surface and a second surface, wherein the first surface is opposite to the second surface; and
 a channel formed in the first surface, wherein a channel longitudinal axis is parallel to a flexible elongated body longitudinal axis;
a plurality of channel connectors disposed in the channel;
an image sensor comprising a sensor connector, wherein the image sensor is removably attached to the channel via the sensor connector and a first channel connector from the plurality of channel connectors; and
one or more rails disposed along a channel length, wherein the image sensor is configured to slide on the one or more rails.

* * * * *